March 3, 1964

J. FAJANS 3,123,711

LUMINOUS SPOT DISPLAY DEVICE

Filed July 21, 1961

INVENTOR.
JACK FAJANS
BY Hans Berman
Agent

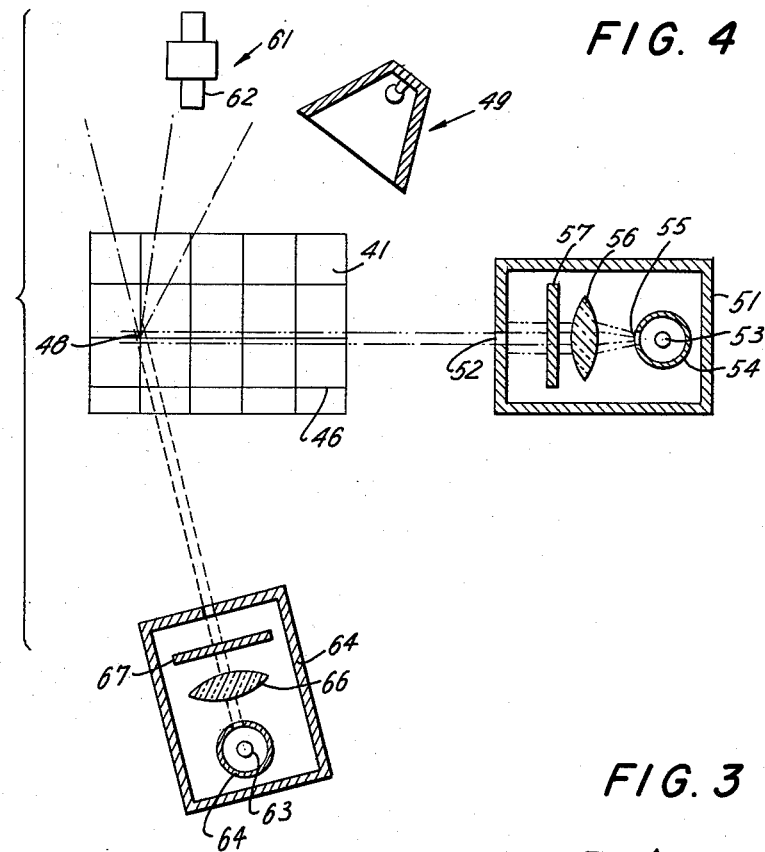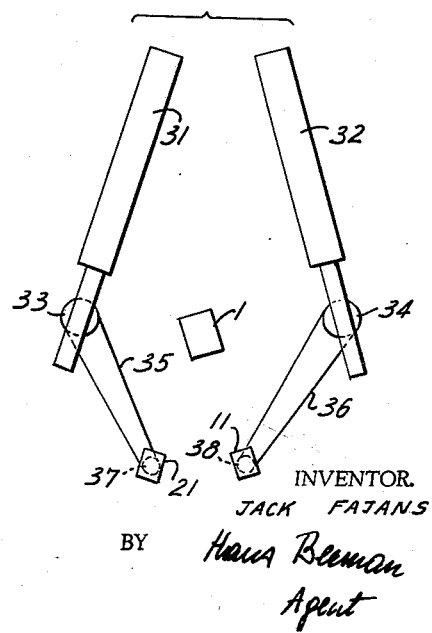

United States Patent Office 3,123,711
Patented Mar. 3, 1964

3,123,711
LUMINOUS SPOT DISPLAY DEVICE
Jack Fajans, Douglaston, N.Y., assignor to Electrokinetics Corporation, Florham Park, N.J., a corporation of New York
Filed July 21, 1961, Ser. No. 125,703
16 Claims. (Cl. 250—71)

This invention relates to display devices, and is more particularly concerned with a device which permits a luminous spot to be created in a transparent medium to indicate and display a spatial relationship.

Known devices permit the distance between an observation point and a target to be determined, and also the direction in which the target is spaced from the observation point to be ascertained. There is a need for a display device which simultaneously indicates both parameters in a visible manner without requiring computation or the consultation of a plurality of indicating instruments. It is the principal object of this invention to provide such a display device.

An additional object of the invention is the provision of a device which permits the position of two targets to be displayed in such a manner as to create at least the illusion of a simultaneous continuous indication.

Other objects of this invention and many of the attendant advantages will become apparent as the disclosure proceeds.

I have found that substances capable of stepwise excitation to a plurality of discrete energy levels may be employed in a display device in which a plurality of beams of radiations of different wavelength serve as signal carriers. Each beam carries a signal corresponding to one of a plurality of parameters, and all signals are simultaneously present in an area of intersection of all beams. When the wavelengths of the several beams are suitably chosen and the area of intersection contains a material capable of being excited stepwise through a plurality of energy levels by the respective radiations of the beams, a predetermined state of excitation is reached by the material only in the area of intersection. Spontaneous emission of electromagnetic radiation by the excited material then creates a source of radiation in space the location of which may convey the signals carried by the several beams.

In its basic aspects, this invention provides a body of material capable of existing in a ground state and in a plurality of excited states, and two sources of beams of radiation. The beam of the first source has an energy corresponding to the transition of the material from the ground state to a first excited state. The energy of the second beam corresponds to the transition of the material from its first excited state to a second state the energy level of which is preferably higher than that of the first excited state. The transition to the second state thus takes place only where both beams are simultaneously effective, and a radiation associated with the second excited state and spontaneously emitted by the material is indicative of the intersection of the beams.

To complete the display device, I make at least one of the radiation sources movable relative to the other for causing the beams to intersect in the material, and the relative movement of the radiation sources is controlled or actuated by external signals.

Several classes of materials capable of stepwise excitation are employed to advantage in my invention. A first class is constituted by vapors of elements capable of stepwise excitation. Mercury vapor offers a number of practical advantages as will become apparent hereinafter, but many other vapors are well suited as the material in which a bright spot is created to display the position of a target and the like in a three-dimensional system.

Another class of suitable materials includes the phosphors which are capable of photostimulation and photoquenching. When excited to luminescence by a first beam of radiation, these phosphors may be stimulated or quenched by a second beam of different wavelength, whereby the area of intersection of two beams may be displayed either as a bright spot on a darker background, or vice versa, dependent on the nature of the phosphor.

These and other features of the display devices of the invention will be readily appreciated as the same becomes better understood by reference to the following detailed description when considered in connection with the accompanying drawings wherein:

FIG. 3 is a plan view of the device of FIG. 1 in cooperation with target-seeking apparatus;

FIG. 4 shows a second embodiment of the invention in a view corresponding to that of FIG. 1.

Figure 1:
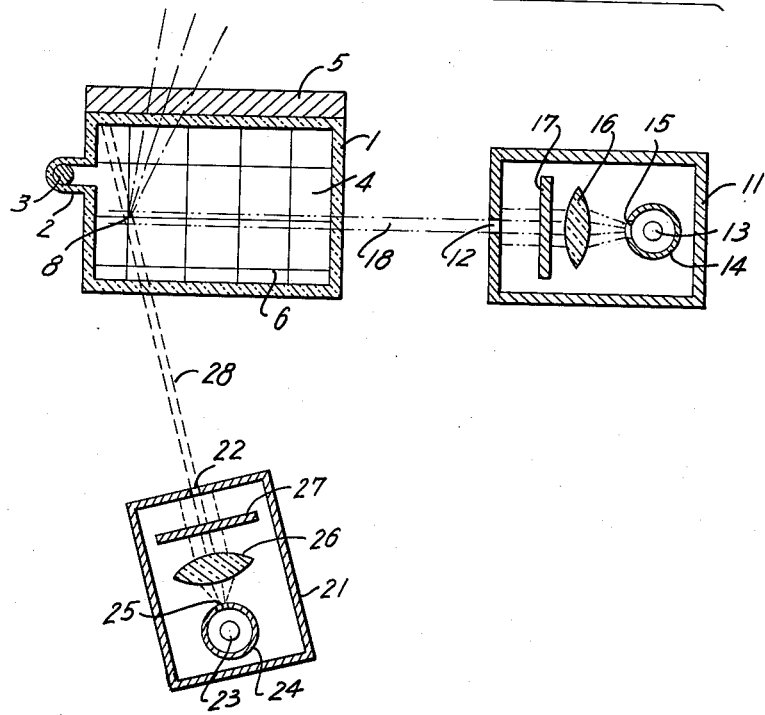
FIG. 1 is a fragmentary sectional plan view of a first embodiment of the display device of the invention.

Referring now to the drawing in detail, and initially to FIG. 1, there is shown a rectangular prismatic cell or container 1 of fused transparent quartz. A tubular appendage 2 of the container contains a drop 3 of mercury which is in equilibrium with its vapors in the cavity 4 of the container. The cavity which is hermetically sealed also contains a small amount of nitrogen, and is evacuated to a total pressure of less than 0.01 mm. Hg. A filter which selectively transmits green light of a wavelength of approximately 5461 angstrom units is mounted on one wall of the container, thus making the wall substantially opaque to light of other wavelengths. A grid of indicia 6 is provided on the outer face of the filter 5 and on other walls of the cell 1 for purposes which will become promptly apparent.

Two pivotally mounted radiation sources are trained on the cell 1. The first source is enclosed in an opaque casing 11 which has a small circular aperture 12. A mercury arc lamp 13 of conventional design is arranged in the casing 11. It is of tubular shape and connected to a source of electric energy in the usual manner, not further illustrated. The lamp 13 is enclosed in an opaque envelope 14, having an opening 15. A glass condenser lens 16 and a filter plate 17 are interposed between the opening 15 of the lamp envelope and the aperture 12 of the casing to collect the radiation emitted by the lamp 13 in an elongated beam 18. The filter plate selectively transmits blue light of a wave length of 4358 angstrom units. The casing 11 is suitably ventilated in a conventional manner (not shown).

The second radiation source is equipped with a casing 21 which differs from the casing 11 of the first source by a slot shaped aperture 22 which is elongated in a direction perpendicular to the plane of FIG. 1.

The mercury arc lamp 23 and its envelope 24 in the casing 21 are substantially identical with the corresponding elements 13, 14 of the first radiation source. The lens 26 and the filter 27 which are interposed between the opening 25 in the lamp envelope and the aperture slot 22 in the casing 21, however, are of different materials. The condenser lens 26 is of fused quartz, and the filter 27 is of a type which selectively transmits ultraviolet radiation of a wave length of 2537 angstrom units.

Filters having selective transmission maxima approximately at 5461, 4358, and 2537 angstrom units are common articles of commerce and available, for example, as Corning filters 3–71, 5–61, and 7–54 respectively.

When the lamps 13, 23 are energized, they respectively emit a pencil beam 18 and a beam 28 in the shape of a sheet the major surface of which is transverse of the pencil beam. They intersect in an area 8 the dimensions of which are small as compared to the surface of the beam 28 in the cavity 4 facing the pencil beam 18. The area 8 emits green light which passes the filter 5 while other visible light is blocked by the filter.

A viewer observing the cavity 4 through the filter 5 thus sees a light spot the position of which in two dimensions may be ascertained by reference to the indicia grid 6 on the filter 5. The position of the area 8 in the third dimension may be observed through the top wall of the quartz cell 1. This wall, not shown in FIG. 1, may also be equipped with a filter of the same type as filter 5, and with a corresponding indicia grid, but omission of such a filter is possible. The ultraviolet radiation emanating from the lamp 23 is effectively filtered so as to be free of a visible component, and the blue color of the light emitted from the lamp 13 which is partially reflected on the internal walls of the cell 1 is readily distinguished from the green light emitted in the area 8 by the mercury vapors.

Figure 2:
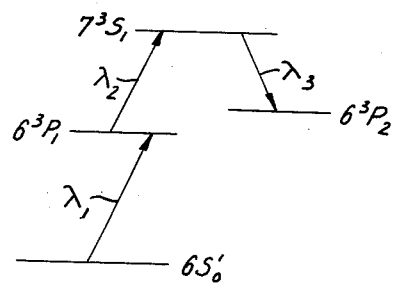
FIG. 2 is a diagram illustrating the several energy levels of mercury isotope 198 relevant to the device of FIG. 1.

The several energy levels of the mercury isotope 198 which account for the green radiation in the area 8 are shown in FIG. 2. The ground state $6S'_0$ is separated from a first excited energy level $6^3P_1$ by an energy difference corresponding to a wavelength $\lambda_1$ of 2537 angstrom units. A transition induced by the radiation of the mercury vapor lamp 23 which includes ultraviolet light of that wavelength thus may raise mercury atoms to the level $6^3P_1$. Spontaneous return of the excited atoms to the ground state $6S'_0$ is accompanied by emission of ultraviolet of the same wavelength, which is invisible.

Energy furnished in the form of photons of wavelength $\lambda_2$, 4358 angstrom units, is not absorbed by mercury atoms in the ground state, but raises excited atoms from the level $6^3P_1$ to the higher energy level $7^3S_1$. Spontaneous emission of radiation from the excited atoms is partially due to return to the state $6^3P_1$, but a green radiation caused by transition to a lower level $6^3P_2$ predominates.

Since the wavelengths of 2537, 4358, and 5461 are specific to the mercury isotope 198, the apparatus illustrated in FIG. 1 operates most efficiently when this isotope constitutes the mercury vapor in the lamps 13, 23, and in the cavity 4. The naturally occurring mixture of mercury isotopes, however, may be employed in the lamps 13, 23, and the resulting relatively inefficient use of the electric energy input will not usually be important. Enrichment of the mercury vapor in the cavity 4 with the isotope 198 brings about a significant improvement in the strength of the green light emitted, and the use of a drop 3 of mercury enriched with the relatively abundant isotope 198 is preferred. Whether or not a drop of substantially pure isotope 198 is to be employed, is largely a matter of economic considerations.

The partial pressure of mercury in the cavity 4 which is necessary for strong emission of green light at the intersection of the beams 18 and 28 is readily established by maintaining the drop 3 at a temperature substantially within the range between 0° C. and 50° C. which includes the entire temperature range conventionally referred to as "room" or "ambient" temperature. Inert gases need not be entirely excluded from the cavity 4, but the total pressure therein should not exceed 0.1 mm. Hg.

The position of the emitting area 8 is determined by the relative position of the beams 18, 28, and an apparatus which employs the device of FIG. 1 in a target finding arrangement is illustrated in FIG. 3. Two telescopes 31, 32 are pivotally mounted for rotation about two axes perpendicular to each other. In order not to crowd the drawing, there is only shown that portion of the apparatus which makes the telescopes 31, 32 and the coordinated casings 11, 21 rotatable about one axis. The telescopes are fixedly connected with respective pulleys 33, 34. Belts 35, 36 are trained about the pulleys 33, 34 and over smaller pulleys 37, 38 which are respectively fastened to the housings 21, 11.

The rotary movement of the telescopes 31, 32 as they are aimed at a target generates mechanical signals which are transmitted to the housings 11, 21 by the belts 35, 36 and actuate a corresponding movement of the housings. The position of the radiating area 8 relative to the indicia 6 thus is indicative of the position of the target at which the telescopes 31, 32 are aimed.

Those skilled in the art will appreciate that the apparatus illustrated in FIG. 3 is further equipped for tilting movement of the telescopes 31, 32 about axes perpendicular to the axes of the pulleys 33, 34 and the optical axes of the telescopes, and with means for transmitting this movement to the cells 11, 21 substantially in the same manner as shown in FIG. 3 to provide three-dimensional movement of the area 8 in the cavity 4 as the telescopes follow a moving target.

Other modifications and variations of the interaction between the display device of the invention and signal generators which control or actuate the relative movement of the radiation sources will readily suggest themselves to the workers in this art. The connection between the signal generator and the radiation sources need not be mechanical, as has been shown in FIG. 3 for the purpose of illustration. An electrical signal may be utilized to control the relative position of two beams in the cavity 4. One such arrangement, the elements of which are known in themselves, may include a signal generator which provides a signal responsive to the distance of a target from an observation post, and a second signal generator which generates a signal indicative of the direction in which the target is spaced from the observation post. The signals may be employed to move the radiation source of the invention by means of a servomotor arrangement to produce an area of emission in the cavity 4 which is correlated to the position of the target.

When the beams 18 and 28 intersect outside the cavity 4, no visible effects are produced. The cavity 4 may therefore be shaped to represent a search area, and the appearance of a bright spot in the cavity, as the beams are moved responsive to scanning devices, such as the telescopes 33, 34, signals the entry of the target into the search area.

The apparatus illustrated and its suggested modifications readily lend themselves to the display of the position of an aircraft approaching a landing field and to similar purposes. The possibility of producing a three-dimensional image of the air space about the landing field and of the aircraft in this field makes the apparatus of FIG. 1 particularly valuable.

Mercury is preferred as the active constituent of the gaseous substance in the cavity 4. Mercury isotope 198 has advantages over other isotopes of mercury because of its relative abundance, and over the naturally occurring mixture of mercury isotopes because of the better utilization of the input energy. However, the apparatus shown in FIG. 1 may readily be adapted for use with other vapors in the cell 1 and other radiation sources. Such adaptation also requires different filters to be employed for selection of the wavelengths of the exciting and the emitted radiations. It is also necessary to maintain the appendage 2 at a temperature at which a solid or liquid body held therein has the desired vapor pressure. The remainder of the cell 1 has to be maintained at a temperature not lower than that of the appendage 2.

Table I lists other elements which may be employed in the appendage 2 instead of mercury to produce the active vapor and the corresponding wavelength $\lambda_1$, $\lambda_2$, and $\lambda_3$ of the two exciting radiations and of the emitted radiation in analogy with the showing of FIG. 2, preferred materials of construction for the cell 1, optimum temperatures at which the appendage 2 should be maintained, and the identifying numbers of the Corning filters which provide the necessary selective transparency of a cell wall.

*Table I*

| Vapor | Cell Material | $\lambda_1$ | $\lambda_2$ | $\lambda_3$ | Corning No. for filter— | | | Optimum temp. for appendage 2 |
|---|---|---|---|---|---|---|---|---|
| | | | | | 27 | 17 | 5 | |
| Zinc | Pyrex[1] | 3,076 | 4,722 | 4,811 | 7-54 | 3-73 | 3-73 | 250-450 |
| Cadmium | Pyrex | 3,261 | 4,799 | 5,086 | 7-54 | 3-73 | 3-73 | 150-400 |
| Potassium | Pyrex | 7,665 | 5,360 | 5,360 | 2-58 | 4-70 | 4-70 | 80-175 |
| Cesium | Pyrex | 8,521 | 6,217 | 6,217 | 2-64 | 1-57 | 1-57 | 100-250 |
| Sodium | Pyrex | 5,890 | 4,893 | 14,800 | 3-67 | 5-57 | 2-64 | 80-150 |

[1] Also quartz.

Vapor arc lamps employing vapors of zinc, cadmium, potassium, cesium, and sodium are being commercially produced at this time, and are preferably employed as radiation sources together with vapors of the same metals in the cell 1. It is evident though that the apparatus of this invention is not limited to any specific source of radiation as long as the radiation is of a wavelength commensurate with a suitable energy transition in the vapor contained in the cell 1.

The list of vapor forming elements in Table I is not complete, and suitable combinations of wavelength can be found for most members of the Periodic System of Elements. Table I is limited to those elements for which corresponding electric arc light sources are readily available now, and the examples given are purely illustrative of the broad range of useful materials.

In the case of potassium and cesium $\lambda_2$ and $\lambda_3$ are identical, and the same material is employed for filters 5 and 17. As pointed out hereinbefore in connection with a display device using mercury vapor in the cell 1, the area 8 emits not only green light of the wavelength 5461 angstrom units ($\lambda_3$) but also blue light of the wavelength 4358 angstrom units ($\lambda_2$). This emission of light is limited to the area of intersection of the beams 18 and 23. The beam 18, although of the same wavelength, is not visible to an observer unless he faces directly into the opening 15. The apparatus of FIG. 1 may thus be modified by replacing the Corning filter 3-71 on the wall of the cell 1 by another sheet of the filter 5-61 which is preferentially permeable to blue light of wavelength 4358 angstrom units, and the location of the area 8 is seen by a spot of blue light the brightness of which is readily distinguished from any reflected light of the beam 18. While the observation of the green emitted light through a filter selectively transparent to light of wavelength 5461 angstrom units is preferred because of the greater sensitivity of the human eye to green light, the arrangement which utilizes only two of the excited states of the mercury atom is entirely practical.

In a similar manner, a display device of the invention employing potassium or cesium vapors uses two identical filters for screening the wavelengths $\lambda_2$ and $\lambda_3$.

The stepwise excitation of a material by photons of two different wavelengths to an energy level at which it spontaneously emits electromagnetic radiation of a wavelength different from at least one of the incident radiations and its use in the display device of the invention is not limited to gaseous materials. Known phosphors lend themselves to use in a display device which has many features in common with that illustrated in FIG. 1, and may be employed in the arrangement of FIG. 3, and in the several modifications thereof mentioned hereinabove.

The apparatus illustrated in FIG. 4 consists of two radiation sources and a carrier body 41 in which a phosphor is dispersed. The carrier body consists of a material which is substantially transparent to the electromagnetic waves employed. In the specific embodiment illustrated, the carrier body 41 consists essentially of polymethyl methacrylate in which a phosphor is dispersed. The phosphor particles are of the order of magnitude of five microns and their concentration in the polymethyl methacylate body is of the order of 10 milligrams per cubic inch.

A body of the type described is prepared by grinding the phosphor until it has the desired particle size distribution, and by mixing the powder obtained with monomeric methyl methacrylate in the indicated ratio. Upon block polymerization of the monomer there is obtained a body at least a portion of which is close to the desired composition. The block is trimmed and cut into sections of the approximate shape of the body 41. Each section is polished and tested. The sections of a block usually differ somewhat in uniformity of phosphor distribution and in their optical properties, but the method indicated quite readily furnishes satisfactory carrier bodies having the phosphor distributed therein with adequate uniformity for the purposes of this invention.

The carrier body is provided on the outside with a grid of indicia 46. A first light source is enclosed in a casing 51 having an aperture 52 of circular shape. An electric lamp 53 producing electromagnetic radiation of a wavelength $f_1$, preferably in the ultraviolet spectrum or near the blue end of the visible spectrum, is enclosed in an opaque envelope 54 having an opening 55. A condensing lens of quartz or other material transparent to the wavelength $f_1$, and a filter selectively transparent to the wavelength $f_1$ are interposed between the opening 55 and the aperture 52 whereby a pencil beam of wavelength $f_1$ is emitted from the casing 51.

The second light source contained in a casing 64' also includes an electric lamp 63, an opaque envelope 64, a condensing lens 66, and a suitable filter 67 arranged in the optical axis of the second light source to produce a sheet like beam of wavelength $f_2$ as described above in connection with FIG. 1. The light produced by the lamp 63 is of a wavelength in the infrared spectrum. The phosphor particles dispersed in the polymethyl methacrylate body 41 are particles of one of the known phosphors listed in Table II.

*Table II*

| Composition of Phosphor | Peak wavelengths, Angstrom units | | |
|---|---|---|---|
| | $f_1$ | $f_2$ | $f_3$ |
| Cub.—Sr(S:Se):[flux]:Sm:Eu | 4,600 | 9,300 | 5,700 |
| Cub.—CaS:[flux]:Sm:Eu | 4,800 | 11,700 | 6,600 |
| Cub.—SrS:[flux]:Sm:Ce | 2,900 | 10,200 | 4,800 |
| Hex.—ZnS:Cu:Pb[SO$_4$]:[NaCl(2)] | 3,700 | 7,500 or 13,200 | 4,880 |
| Hex—9ZnS:1CdS:Cu(0.0073) | Abt. 4,200 | 7,200 | |
| ZnS(Cu) | Below 4,200 | Abt. 7,000 | |

These phosphors are prepared according to the methods described by H. W. Leverenz ("Luminescence of Solids," Wiley, 1950, p. 308, also pp. 67, 68).

The phosphors of Table II are excited by electromagnetic radiation of ultraviolet and short visible wavelengths $f_1$ to an excited state. The first four phosphors listed are capable of being further excited by photostimulation to a higher energy level when irradiated by infrared light the optimum wavelength $f_2$ of which varies with individual phosphors. Upon such stimulation, they emit visible light of a wavelength $f_3$ which is different from both $f_1$ and $f_2$, and thus permits observation of areas irradiated by both sources. The two phosphors listed last show the opposite behavior. When they are first excited with light of the ultraviolet spectrum, or with visible light of high frequency, their luminescence is then quenched by irradiation with light having a wavelength corresponding to the red end of the visible spectrum or the near infrared spectrum.

Since the phosphors enumerated in Table II emit visible light upon excitation with radiation of wavelength $f_1$, I prefer to view the body 41 through an optical system 61 including a shutter 62, particularly when employing a photostimulated phosphor. I also provide an additional source 49 of infrared radiation which is arranged to irradiate the entire body 41 when energized.

When the phosphor dispersed in the body 41 is of the type capable of photostimulation the apparatus shown in FIG. 4 is operated as follows:

The lamp 53 is energized to irradiate a portion of the body 41 with light of wavelength $f_1$, whereupon the lamp 53 is shut off, and the resulting luminescence of the phosphor is permitted to decay for a period of the order of three seconds. The lamp 63 is energized thereafter and the shutter 62 is opened. The area 48 in which the beams emitted by the lamps 53 and 63 intersect is seen as a spot distinguished by brightness and color from the surrounding portions of the body 41.

The shutter is then closed and the third radiation source 49 is energized to irradiate the entire body 41 with infrared light and to promote decay of residual luminescence, whereupon the cycle initiated by the energizing of the lamp 53 may be repeated.

The apparatus illustrated is combined with a range finding apparatus of the type illustrated in FIG. 3 or with any modification thereof in the same manner as the device illustrated in FIG. 1, and the location of a target can be read from the relative positions of the area 48 and the suitably calibrated grid indicia 46.

Where a scanning device furnishes sequential signals related to the position of more than one target for actuating movement of the radiation sources 51, 64', bright spots will appear alternatingly in different areas of the body 41, and provide a three-dimensional indication of the relative positions of a plurality of aircraft approaching the same landing field, or similar information.

The apparatus shown in FIGS. 1 and 3 is capable of operating in a similar manner when the lamps 13 and 23 are provided with timing switches and emanate simultaneous short bursts of radiation. Movement of the light sources between positions respectively corresponding to the several targets take place between the periods of radiation. If the sequence of these periods is sufficiently rapid, the well-known property of the human eye of retaining an image for a fraction of a second will provide the illusion of a plurality of bright areas appearing and moving simultaneously in the cavity 4.

When the phosphor employed in the apparatus of FIG. 4 is of the type capable of photoquenching, the use of the optical system 61 with its shutter 62 may be unnecessary, and the area of intersection of the beams will appear as a dark spot on a relatively bright background. When employing a phosphor of the photoquenching type, I prefer to view the body 41 substantially in the direction of the beam of wave length $f_2$, and to make the thickness of the body in that direction substantially smaller than the other dimensions of the body.

It is evident without further discussion that the term $f_3$ has no meaning in connection with photoquenching phosphors.

Obviously many modifications and variations of the present invention are possible in the light of the above teachings. It is therefore to be understood that within the scope of the appended claims, the invention may be practiced otherwise than as specifically described.

What I claim is:

1. A display device comprising a body of material capable of existing in a ground state and in a plurality of excited states; a source of a first radiation having an energy corresponding to the transition of said material from said ground state to a first excited state thereof; a source of a second radiation having an energy corresponding to the transition of said material from said first state thereof to a second excited state of an energy level higher than the energy level of said first state; collecting means for collecting said first radiation and said second radiation in respective beams, at least one of said beams being elongated; and moving means for moving one of said beams relative to the other beam for causing said beams to intersect in a selected portion of said material, whereby said material in said portion is selectively excited to said second state, and emits electromagnetic radiation while undergoing spontaneous transition from said second state to a state having a lower energy level.

2. A display device comprising a container enclosing a cavity; a gaseous substance filling said cavity and including gas particles capable of existing in a ground state and in a plurality of excited states; a source of a first radiation having an energy corresponding to the transition of said gas particles from said ground state to a first excited state thereof; a source of a second radiation having an energy corresponding to the transition of said gas particles from said first state thereof to a second excited state of an energy level higher than the energy level of said first state; collecting means for collecting said first radiation and said second radiation in respective beams, at least one of said beams being elongated; and moving means for moving one of said beams relative to the other beam for causing said beams to intersect in a selected area in said cavity whereby said gas particles in said area are selectively excited to said second state, and spontaneously emit electromagnetic radiation.

3. A device as set forth in claim 2, wherein said first source is a source of mercury vapor light emitting a beam of electromagnetic radiation having substantially a wave length of 2537 angstrom units; said second source is a source of mercury vapor light emitting electric radiation having substantially a wave length of 4358 angstrom units; and said gas particles are particles of mercury, whereby said particles in said area spontaneously emit electromagnetic radiation having a wave length of 5461 angstrom units.

4. A device as set forth in claim 2, wherein the proportion of mercury isotope 198 in said particles of mercury is higher than in naturally occurring mercury.

5. A device as set forth in claim 2, wherein said container has a wall portion at least partly transparent to the spontaneously emitted radiation of said gas particles.

6. A device as set forth in claim 5, wherein said wall portion is substantially opaque to at least one of said first and second beams.

7. A device as set forth in claim 2, wherein one of said beams defines a surface in said cavity, and the other beam is elongated and intersects said surface, the area of intersection between said surface and said other beam being a minor fraction of said surface.

8. A device as set forth in claim 2, wherein said particles are mercury particles at a partial pressure corresponding to the vapor pressure of mercury at a temperature between 0 and 50° C., and the total pressure of said gaseous substance in said cavity does not substantially exceed 0.1 mm. mercury.

9. A device as set forth in claim 8, wherein the remainder of said gaseous substance essentially consists of nitrogen.

10. A device as set forth in claim 2, wherein said moving means includes signal generating means, and actuating means responsive to the signal generated for actuating movement of said source of a first beam of radiation relative to the source of said second beam of radiation.

11. A device as set forth in claim 10, further including indicia means on said container, the relative position of said area and of said indicia means being indicative of said signal.

12. A device as set forth in claim 2, further comprising indicia means on said container, said indicia means and said sources constituting the three members of an indicating system; and two signal generators, said moving means being responsive to the signals generated by said generators for respectively moving two of said members relative to the third member for causing said beams to interesect in said cavity.

13. A display device comprising a phosphor capable of stimulated emission of electromagnetic radiation responsive to stimulating radiation when in the excited state; a source of a first radiation adapted to excite said phosphor; a source of a second radiation adapted to stimulate said phosphor when in the excited state; collecting means for collecting said first radiation and said second radiation in respective beams, at least one of said beams being elongated; and moving means for moving one of said beams relative to the other beam for causing said beams to intersect on a selected portion of said phosphor, whereby said portion of said phosphor is selectively excited by said first beam and stimulated by said second beam to emit electromagnetic radiation.

14. A display device comprising a body having particles of a phosphor dispersed therein, said phosphor being capable of stimulated emission of electromagnetic radiation responsive to stimulating radiation when in the excited state; a source of a first radiation adapted to excite said phosphor; a source of a second radiation adapted to stimulate said phosphor when in the excited state, said body being at least partially permeable to said radiation; collecting means for collecting said first radiation and said second radiation in respective beams, at least one of said beams being elongated; and moving means for moving one of said beams relative to the other beam for causing said beams to intersect on a selected portion of said body whereby the phosphor particles dispersed in said portion of said body are selectively excited by said first beam and stimulated by said second beam to emit electromagnetic radiation.

15. A display device comprising a phosphor capable of being quenched responsive to quenching radiation when in the excited state; a source of a first radiation adapted to excite said phosphor; a source of a second radiation adapted to quench said phosphor when in the excited state, said body being at least partially permeable to said radiations; collecting means for collecting said first radiation and said second radiation in respective beams, at least one of said beams being elongated; and moving means for moving one of said beams relative to the other beam for causing said beams to intersect on a selected portion of said phosphor, whereby said portion of said phosphor is selectively excited by said first beam and quenched by said second beam.

16. A display device comprising a body having particles of a phosphor dispersed therein, said phosphor being capable of being quenched responsive to quenching radiation when in the excited state; a source of a first radiation adapted to excite said phosphor; a source of a second radiation adapted to quench said phosphor when in the excited state, said body being at least partially permeable to said radiations; collecting means for collecting said first radiation and said second radiation in respective beams, at least one of said beams being elongated; and moving means for moving one of said beams relative to the other beam for causing said beams to intersect on a selected portion of said body, whereby the phosphor particles dispersed in said portion of said body are selectively excited by said first beam and quenched by said second beam.

References Cited in the file of this patent

UNITED STATES PATENTS

| 2,549,860 | Swanson | Apr. 24, 1951 |
| 2,604,607 | Howell | July 22, 1952 |
| 2,996,617 | Hickscher | Aug. 15, 1961 |

OTHER REFERENCES

Rate Analysis of Multiple-Step Excitation in Mercury Vapor, by R. Zito, Jr., Journal of Applied Physics, vol. 34, No. 5, May 1963, pp. 1535 to 1543.